US007937239B2

(12) United States Patent
Boyd

(10) Patent No.: US 7,937,239 B2
(45) Date of Patent: *May 3, 2011

(54) SYSTEM AND METHOD FOR SELECTING ERGONOMIC SLEEP COMPONENTS WITH MATTRESS SELECTION SYSTEM PROVIDING INPUT FOR PILLOW SELECTION SYSTEM

(76) Inventor: Dennis M. Boyd, Maryland Heights, MO (US)

( * ) Notice: Subject to any disclaimer, the term of this patent is extended or adjusted under 35 U.S.C. 154(b) by 244 days.

This patent is subject to a terminal disclaimer.

(21) Appl. No.: 12/106,028

(22) Filed: Apr. 18, 2008

(65) Prior Publication Data

US 2008/0209641 A1 Sep. 4, 2008

Related U.S. Application Data

(63) Continuation-in-part of application No. 11/610,776, filed on Dec. 14, 2006, which is a continuation-in-part of application No. 11/184,427, filed on Jul. 19, 2005, now abandoned, and a continuation-in-part of application No. 11/399,059, filed on Apr. 6, 2006, now Pat. No. 7,467,058.

(51) Int. Cl.
*G01D 1/00* (2006.01)

(52) U.S. Cl. ........................................ 702/127

(58) Field of Classification Search .................. 702/127, 702/129, 139, 189
See application file for complete search history.

(56) References Cited

U.S. PATENT DOCUMENTS

| | | | |
|---|---|---|---|
| 5,020,176 A * | 6/1991 | Dotson | 5/710 |
| 5,148,706 A | 9/1992 | Masuda et al. | |
| 6,571,192 B1 | 5/2003 | Hinshaw et al. | |
| 6,585,328 B1 * | 7/2003 | Oexman et al. | 700/117 |
| 6,741,950 B2 | 5/2004 | Hinshaw et al. | |
| 6,990,425 B2 | 1/2006 | Hinshaw et al. | |
| 6,997,070 B2 | 2/2006 | Killingbeck | |
| 2002/0013743 A1 | 1/2002 | Shoffner | |
| 2004/0177449 A1 | 9/2004 | Wong et al. | |
| 2004/0194270 A1 | 10/2004 | Flippin | |
| 2006/0236460 A1 | 10/2006 | Hooper | |
| 2008/0154670 A1 | 6/2008 | McAlhaney | |

OTHER PUBLICATIONS

Brochure: "1 perfect sleep system." SLEEP to LIVE®.
Brochure: "partner perfect two body profiles. one perfect bed.®" SLEEP to LIVE®.
Seth Stevenson, "Going to the Matresses", Slate, Nov. 23, 2000.
The Company Store Pillow Guide Website dated Jul. 2004 accessed via Internet Archive.

* cited by examiner

*Primary Examiner* — Drew A Dunn
*Assistant Examiner* — Stephen J Cherry
(74) *Attorney, Agent, or Firm* — Thompson Coburn LLP

(57) ABSTRACT

A method is provided for selecting a pillow and mattress based upon an empirical measurement of an individual's pillow selection criteria, mattress selection criteria and sleep characteristics. In accordance with the method, an individual's position on a diagnostic mattress and a controller associated with the diagnostic mattress is operated to measure a pressure of the air mattress via a pressure sensor. The measured pressure of the individual positioned on the diagnostic mattress is correlated to a recommended support level. The individual's recommended support level is correlated to a support characteristic thereby allowing the individual to select a fixed support structure. A system incorporating the principles of the method is also disclosed.

15 Claims, 13 Drawing Sheets

SYSTEM AND METHOD FOR SELECTING ERGONOMIC SLEEP COMPONENTS WITH MATTRESS SELECTION SYSTEM PROVIDING INPUT FOR PILLOW SELECTION SYSTEM

CROSS-REFERENCE TO RELATED APPLICATIONS

"This application is a continuation-in-part of application Ser. No. 11/610,776, filed on Dec. 14, 2006, currently pending, which is a continuation-in-part of application Ser. No. 11/184,427, filed on Jul. 19, 2005, now abandoned, and a continuation-in-part of application Ser. No. 11/399,059, filed Apr. 6, 2006, now U.S. Pat. No. 7,467,058, issued Dec. 19, 2008, the disclosures of which are incorporated by reference herein".

BACKGROUND OF THE INVENTION

This disclosure presents additional systems and methods for selecting a pillow and mattress, which build upon the inventor's previously developed systems as disclosed and claimed in the applications set forth above.

Most everyone desires a good night's rest. Choosing the right pillow for a person's mattress and sleep characteristics is essential to ensuring a restful sleep. The correct pillow enhances a person's sleep by adding to the comfort of the mattress. The correct pillow also ensures proper spinal alignment. Selecting the wrong pillow can result in an improper neck, shoulder, and spinal alignment which can result in poor sleep efficiency and/or pain.

However, choosing the correct pillow for a person's mattress and sleep characteristics can be difficult. There are many different types of pillows available on the market today. Some vary in content (i.e., foam, fiber, air, or water), and some vary in shape (i.e., contour, flat, bulky, wide, or narrow). Pillows also vary in height and width, and in compression or interload force deflection ("IFD"). Soft pillows have a relatively low IFD while firm pillows have a relatively high IFD. The number of choices of pillows increases the probability that a person will select the wrong pillow for his or her mattress and sleep characteristics.

One major variable affecting pillow selection is a person's sleeping position. A person may prefer to sleep on their side, back, stomach or may alternate between these positions. Some research has shown that 68% of the U.S. population sleeps on their side, 16% on their back, 8% on their stomach and 8% use multiple positions. Moreover, the position that a person prefers in order to fall asleep may be different than the person's predominant position while sleeping.

Furthermore, the number of different types of mattresses available on the market compounds the problem. For instance, certain types of pillows complement foam mattresses, while others work best with waterbeds. Some types of pillows work better with innerspring mattresses, and yet others work better with air beds. While each of these types of mattresses may be generally categorized as a plush or soft, medium, or firm, the relative firmness of a pillow must complement the relative firmness of the mattress. Although compression tests may also be used to objectively measure the firmness of these types of mattresses, many people do not correctly categorize the relative firmness of their mattress.

Consumers generally have a challenging time verbalizing to the retail salesperson what they want in a mattress, and consequently, a pillow. This inability to verbalize the characteristics of a mattress, and thus a pillow, creates a disconnect between a consumer and a salesperson in the typical retail environment. Often in the retail environment when a consumer walks into a store and asks to see a mattress, the salesperson likely posits the question, "What kind of a mattress are you looking for?" The customer usually then replies, "Firm," "Supportive," "Pillowtop," or "The one that's on sale." This exchange is unproductive. None of the consumer's answers help the salesperson understand how to match a mattress, and thus a pillow, with the consumer's specific needs. Many times a consumer will think they want a "firm mattress." However, after sampling several "firm mattresses" offered by the salesperson and objecting to them because they "feel too hard," consumers eventually come to the realization that what they really need is a medium or plush mattress. Unfortunately, this process of repeatedly sampling mattresses offered by the salesperson tends to frustrate the consumer. More often than not, frustrated with the sales experience, the consumer will leave the store and postpone the purchase of a mattress to another day—less often will the consumer doggedly persist through the sampling process to finally arrive at a mattress that fits his or her needs. Without knowing what type of mattress is desired or needed, the consumer cannot efficiently select a pillow.

Ultimately, the consumer is looking for a better night's sleep and wants to purchase a quality mattress and pillow to improve their chances of achieving this. Further complicating the mattress selection process is the fact that there are two main variables affecting a consumer's purchasing decision, comfort and support. In order to find a quality pillow and mattress that meets the consumer's needs, they must have the right combination of both comfort and support. However, whether a quality mattress has the right combination of comfort and support for particular consumer is a very subjective individualized assessment. Currently, this assessment is made through the verbal exchange of the salesperson and consumer, as explained above. And as explained above, defining comfort or support verbally is not an easy task, and one which can easily frustrate the sales process and result in the consumer either leaving the store or choosing a mattress and/or pillow that is not a good fit for him or her. In the latter case, the store must then deal with returns, unhappy customers and/or lost profits.

Compounding the problem is that most consumers test a prospective new mattress while lying on their backs. Most consumers and salespersons ignore that approximately 65% of consumers actually sleep on their side. A mattress that feels good when one is lying on his or her back does not necessarily feel good when one is lying on his or her side. When lying on one's side, one will generate additional surface pressure as his or her weight is dispersed over a smaller area. In addition, when lying on one's side, the profile of the body is more generally pronounced. In other words, in the side lying position, the vertical height difference between the shoulder and the waist is generally greater than the vertical height difference between the lumbar and buttocks in the back lying (supine) position. This difference in weight distribution results in different pressure points for a side sleeper and a back sleeper. Thus, depending upon whether the consumer is predominantly a side sleeper or a back sleeper, the support structure of the mattress and the type of pillow may need to be substantially different. Because of differences in a consumer's body profile and pressure points in the predominant sleep position, it is important for a consumer to define comfort and support in terms of his or her predominant sleep position.

With all of these variables, it is often difficult for a consumer to determine the proper pillow and mattress for their individual use. In the case of a pillow, they are often purchased from mass merchants where there is no consultative selling. Consequently, many consumers chose the wrong pillow for their type use. Even in a situation where the consumer is purchasing from a store that has professional sales assistance (i.e., mattress stores, furniture stores, and department stores), time and training constraints make it difficult for these salespeople to sufficiently probe the consumer as to his or her pillow, mattress and sleep characteristics, and process this information correctly so as to determine the appropriate pillow and mattress for the consumer. It is clear that an effective tool to assist consumers in the selection of a proper mattress and pillow is needed.

SUMMARY OF THE INVENTION

It is in view of the above problems that the present invention was developed. In one aspect of the invention, a method is provided. In accordance with the method, a diagnostic mattress comprising an air mattress with a controller and an air pump is provided. The controller is adapted to control the air pump to vary pressure within the air mattress. The air pump has a pressure sensor adapted to sense pressure within the air mattress, and the controller is adapted to activate the pressure sensor to measure pressure within the air mattress. An individual is positioned on the diagnostic mattress. The controller is operated to measure a pressure of the air mattress via the pressure sensor with the individual positioned on the diagnostic mattress. The measured pressure of the individual positioned on the diagnostic mattress is correlated to a recommended support level associated with the individual. The individual's recommended support level is correlated to a support characteristic of a plurality of mattresses having a fixed support structure in a way sufficient to allow the individual to select a fixed support structure support characteristic generally equal to the individual's recommended support level as determined from the diagnostic mattress.

In another aspect of the invention, a system is provided. The system comprises a diagnostic mattress comprising an air mattress with a controller and an air pump. The controller is adapted to control the air pump to vary pressure within the air mattress. The air pump has a pressure sensor adapted to sense pressure within the air mattress, and the controller has an actuator to actuate the pressure sensor to measure pressure within the air mattress with the individual positioned on the diagnostic mattress. The controller is configured to correlate the measured pressure of the individual positioned on the diagnostic mattress to a recommended support level associated with the individual and to generate a report correlating the individual's recommended support level to a support characteristic of a fixed support structure of a mattress in a plurality of mattresses. The report is sufficient to allow the individual to select a fixed support structure support characteristic generally equal to the individual's recommended support level as determined from the diagnostic mattress based upon the report.

In another aspect of the disclosure, a system is provided that is adapted to recommend ergonomic sleep components to an individual. The system has an air mattress with a controller and an air pump. The controller is adapted to control the air pump to vary pressure within the air mattress. The air pump has a pressure sensor adapted to sense pressure within the air mattress, and the controller has an actuator to actuate the pressure sensor to measure pressure within the air mattress with the individual positioned on the air mattress. The controller is configured to correlate the measured pressure of the individual positioned on the air mattress to a recommended support level associated with the individual and to generate a report correlating the individual's recommended support level to a support characteristic of a fixed support structure of a mattress in a plurality of mattresses. The report is sufficient to allow the individual to select a fixed support structure support characteristic generally equal to the individual's recommended support level as determined from the diagnostic mattress based solely upon the report. The system includes a computer system comprising a processor, a database configured to store data relating to pillows including pillow models, a user interface adapted to receive at least one pillow selection criteria associated with the individual and display a recommended pillow model to the individual, and a computer program contained on a computer readable medium having instructions executable by the processor for receiving a plurality of pillow selection criteria associated with the individual including the individual's recommended support level; and determining at least one pillow model based on the individual's recommended support level and pillow selection criteria.

Further features and advantages of the present invention, as well as the structure and operation of various embodiments, are described in detail below with reference to the accompanying drawings.

BRIEF DESCRIPTION OF THE DRAWINGS

The accompanying drawings, which are incorporated in and form a part of the specification, illustrate the embodiments disclosed herein.

FIGS. 2-16 show graphical displays of the system allowing a customer to input his or her pillow, mattress and sleep characteristics;

DETAILED DESCRIPTION OF THE DISCLOSED EMBODIMENTS

As set forth in the parent applications, the inventor has conducted, reviewed and analyzed extensive research and studies to assist in determining the proper head, neck, and spinal alignment for various pillow types for various sleeping positions based upon various firmness levels of mattresses, as well as other relevant pillow selection criteria as discussed herein and in the inventor's parent applications. This information was then interpreted, correlated and extrapolated to popular pillow products available on the market and most likely to be stocked by a retail, catalog or online establishment. A database containing all of this information was then created. Based on the database information, it was then determined which pillow or pillows subjectively give a user having certain pillow selection criteria the most comfort.

Two pillow selection criteria found to be the most critical in the pillow selection process are: (1) the type of mattress, that is, whether the mattress is firm, medium or soft; and (2) the preferred sleeping position, that is, side, back, stomach, or a combination thereof. For instance, persons sleeping on their sides were found to generally have a greater need for a pillow with a high loft and/or a higher IFD to keep their head in alignment with their neck and spine while lying on the pillow. A side sleeper on a plush mattress was found to not need as tall of a pillow as a side sleeper on a firm mattress since the shoulder of the side sleeper was found to dip into the mattress deeper on a plush mattress than a firm mattress, thus reducing the distance between the person's head and the mattress. Persons sleeping on their backs were generally found to be more comfortable with contour pillows as the contoured pillow provided support to the neck and opened up their air passages to breathe more freely. Other pillow selection criteria identified as relevant to the pillow selection process include, without limitation, a person's gender, height, propensity to snore, and the presence or absence of allergies, shoulder pain, and neck pain.

As will become evident from the discussion that follows, the content of the database may vary. Such variations may occur for several reasons, including without limitation changes in the pillow products available on the market, and additions or deletions of pillow selection criteria that are identified as relevant to the pillow selection process. The database may also vary in the way that certain pillow products are correlated to a desired or recommended pillow characteristic.

Figure 1:
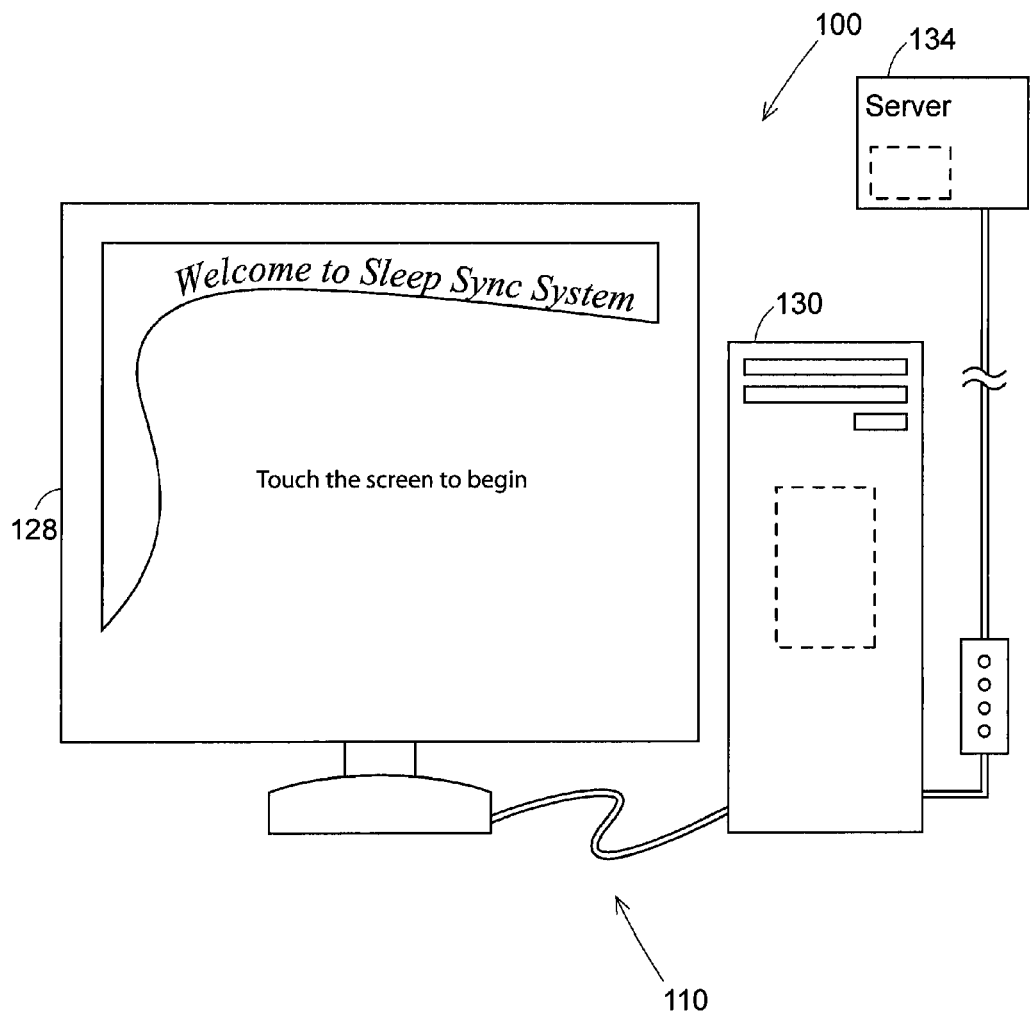
FIG. 1 shows implementation of one embodiment of a pillow and mattress selection system employed in a retail store environment comprising a kiosk where a customer can input his or her pillow, mattress and sleep characteristics into the system.
Figure 3:
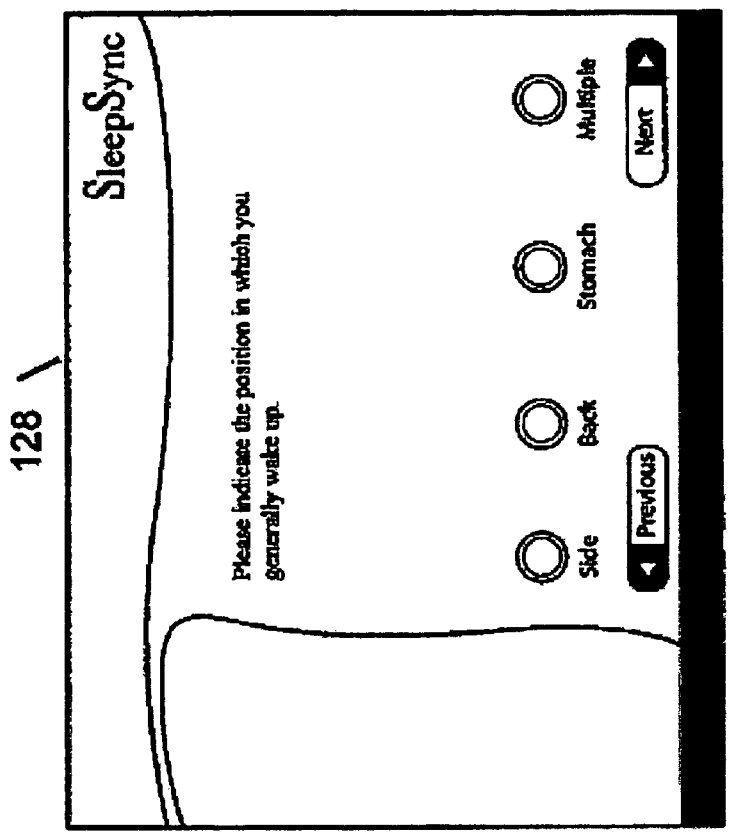

FIG. 1 shows an implementation of a system 100 for selecting a mattress and pillow in accordance with one embodiment of the present invention employed in a retail store environment. The system 100 of FIG. 1 comprises a computer 110 and a database (not shown) having data related to mattress and pillow selection criteria and mattress and pillow models. The system may be in the form of a personal computer, a kiosk or any other device having a display 128, a processor 130 and means for a user to input information. The input means may be a keyboard, a "touch screen", a mouse, or any other device that allows the purchaser to input information. Pillow selection software installed on or accessible via the processor 130 is configured to retrieve the recommended pillow and mattress model for a user based upon the user's inputted pillow selection criteria. In the embodiment shown in FIG. 1, the processor 130 is connected to a central server 134 via a local area network to which other computers, such as order processing computers, in the store may also be connected. However, the pillow selection device may alternatively and/or also comprise one or more standalone PCs on which the pillow selection software is installed locally. The pillow selection software can also be made available through the Internet such that any device having Internet access (e.g., computer, phone, PDAs, etc.) and means for inputting information may be used. A printer (not shown) may also be provided to allow the purchaser to print the recommended pillow model, the pillow selection criteria associated therewith, a mattress model, mattress selection criteria, and/or other related pillow and mattress information.

With further reference to FIGS. 2-16, the pillow selection software is accessed via the display 128. In one embodiment, the plurality of pillow selection criteria are displayed in the form of questions to a prospective pillow purchaser. The pillow selection software defines a set of available answers corresponding to each question. Below is a listing of questions used to develop the pillow selection criteria, the questions and answers may be as follows:

| Screen No. | Question | Answer Set |
|---|---|---|
| 1 (FIG. 2) | What size mattress are you shopping for? | Twin, Double, Queen, King |
| 2 (FIG. 3) | Does movement by your sleep partner disturb your sleep? | Always, Sometimes, Never |
| 3 (FIG. 4) | What is your height? | (less than 5' 6"), (5' 6" to 6'), (6' 1' or taller) |
| 4 (FIG. 5) | What is your gender | Male, Female |
| 5 (FIG. 6) | In what position do you generally fall sleep? | Side, Back, Stomach, Multiple |
| 6 (FIG. 7) | In what position do you generally wake up? | Side, Back, Stomach, Multiple |
| 7 (FIG. 8) | How often do you experience tossing and turning? | Frequently, Occasionally, Seldom, Never |
| 8 (FIG. 9) | Please indicate any areas where you experience pain or discomfort while in bed? | Head, Shoulders, Arms, Hips, Legs, Lower-Back, Mid-Back, Upper Back, Neck, Never |
| 9 (FIG. 10) | Do you have any of these health concerns? | Asthma, Snoring, Arthritis, Poor Circulation, None |
| 10 (FIG. 11) | Do you have allergies? | Dust, Latex, Other, Mold, Feathers/Down, None |
| 11 (FIG. 12) | Have you slept on your existing pillow for more than one year? | Yes, No |

-continued

| Screen No. | Question | Answer Set |
| --- | --- | --- |
| 12 (FIG. 13) | How long have you slept on your existing mattress? | 1-5 years, 6-10 years, Over 10 years |
| 13 (FIG. 14) | Please position yourself on the diagnostic mattress so the system can complete the process that will determine your ideal mattress and pillow selection | |
| 14 (FIG. 15) | What is your mattress Comfort Index as determined by the diagnostic process? | 1 (Plush), 2 (Medium) 3 (Medium), 4 (Firm) |
| 15 (FIG. 16) | The system recommends the following pillow and sleep accessory choices to fit your personal sleep position and needs. | Display recommended pillow, alternate pillows and complementary products, together with their availability, stock no. and price |

In each case, the prospective purchaser is prompted to select his or her type of mattress. The answer to the purchaser's type of mattress may be based upon an empirical measure of a purchaser's desired support level, as measured on a diagnostic mattress, for instance, the support index or comfort index, or may be subjective based upon the purchaser's own feelings of mattress characteristics, for instance, "Plush," "Medium," or "Firm." However, the selection of a mattress may also be performed solely via empirical pressure measurements of the individual reposing on the diagnostic mattress without direct and subjective input from the individual.

Figure 16:
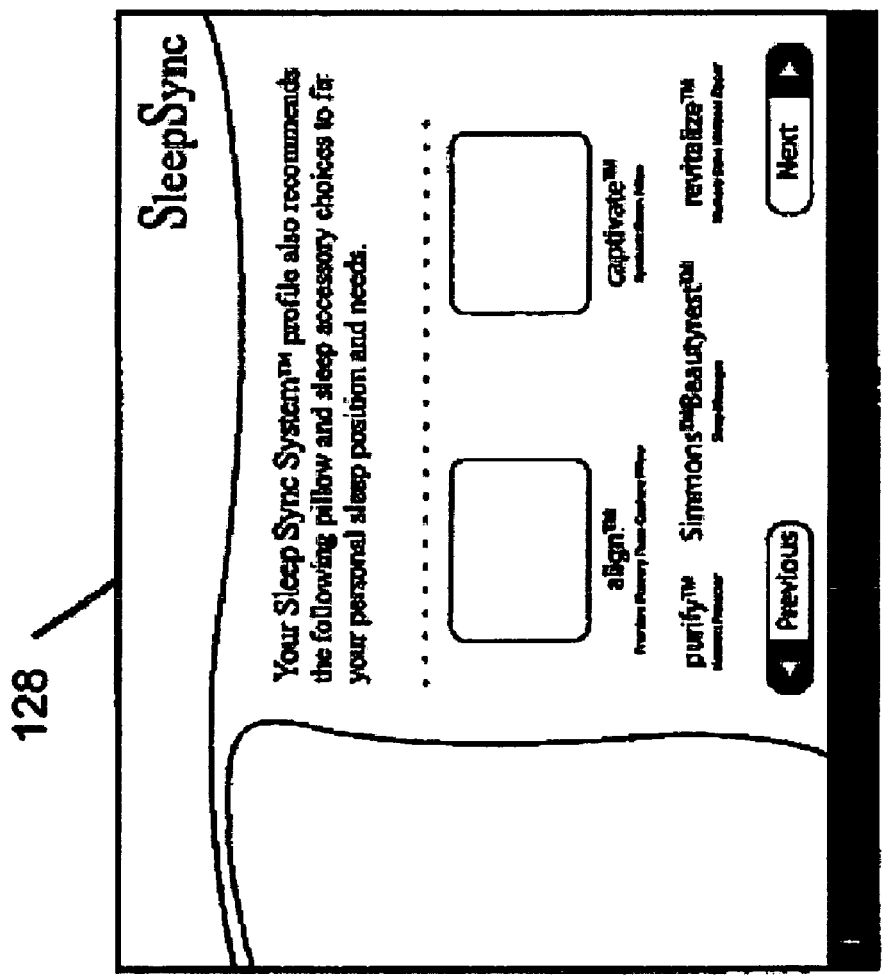

In FIG. 16, the system recommends at least one mattress pad and/or topper based on the purchaser's inputted pillow selection criteria. In another embodiment, the pillow selection system also prints a document having the recommended pillow model identified on it, thereby allowing the purchaser, as described previously, to either go to a bin displaying the pillow model to obtain the recommended pillow, or give to a salesperson to complete the purchase. The system may also preferably store a purchaser's pillow selection criteria as a "personal profile," thereby allowing the purchaser to retrieve, modify, or update their "personal profile," as necessary. The system may also allow the customer to input a salesperson's name and survey information about the salesperson and the store.

The graphical displays generated by the pillow selection software are preferably chosen to increase the user friendliness of the pillow selection process and the pleasure of the shopping experience, and/or enhance the promotion and advertising of the pillows, related products and/or the establishment. For instance, when the purchaser inputs his or her gender, a graphic resembling a male or female form appears on the screen, as applicable. In an alternate embodiment, the graphics are self-intuitive so that once they appear, the purchaser is prompted to respond without the need for a textual prompt. For example, figures showing individuals in the various sleep positions could be used. In the case of the height pillow selection criteria, a graphic resembling the male or female form may increase or decrease in scale according to the purchaser's selection. When the purchaser has selected his or her predominant sleeping position, a graphic resembling the male or female form may become animated and move to the selected sleeping position. Likewise, when the firmness level of the mattress is input, a graphic of a male or female form shown lying on the mattress and the relationship of the mattress to the body position may be shown. For example, a side sleeper on a plush mattress is shown as having the shoulder dipping into the mattress as compared to a side sleeper on a firm mattress whose shoulder is shown without a mattress impression.

Once the prospective pillow purchaser has input all of the relevant pillow selection criteria, a graphic such as that shown in FIG. 16 identifying one or more pillow models that meet his or her particular pillow selection criteria may be displayed. In one embodiment, the pillow selection software may provide the prospective purchaser with at least one or more recommended substitute pillow models in the event his or her recommended pillow model is not available, and corresponding pricing information to assist the purchaser in his or her purchasing decision. In a preferred embodiment, the pillow selection software interfaces with the establishment's order entry system allowing the purchaser to purchase a pillow directly from the pillow selection device.

As described previously, ideally a retailer will have an inventory of pillows corresponding to all possible pillow models. However, as a practical matter, retailers often only carry certain types of the most common pillow models or substitutes therefor. Accordingly, the pillow selection software preferably allows the retailer to customize the database. The database also preferably interacts with a retail establishment's inventory control system to provide the purchaser with options in selecting a pillow in the event the recommended pillow model is out of stock.

As described above, a pillow is selected to preferably complement specific mattress characteristics. Given the problems inherent in correctly determining characteristics of a mattress, the inventor has continued his work and developed a method and system for empirically measuring an individual's desired level of support and comfort for a mattress utilizing the techniques disclosed in the inventor's parent application directed to mattress selection systems and methods. A brief overview of the mattress selection method and portion of the system will be described below.

Figure 17:
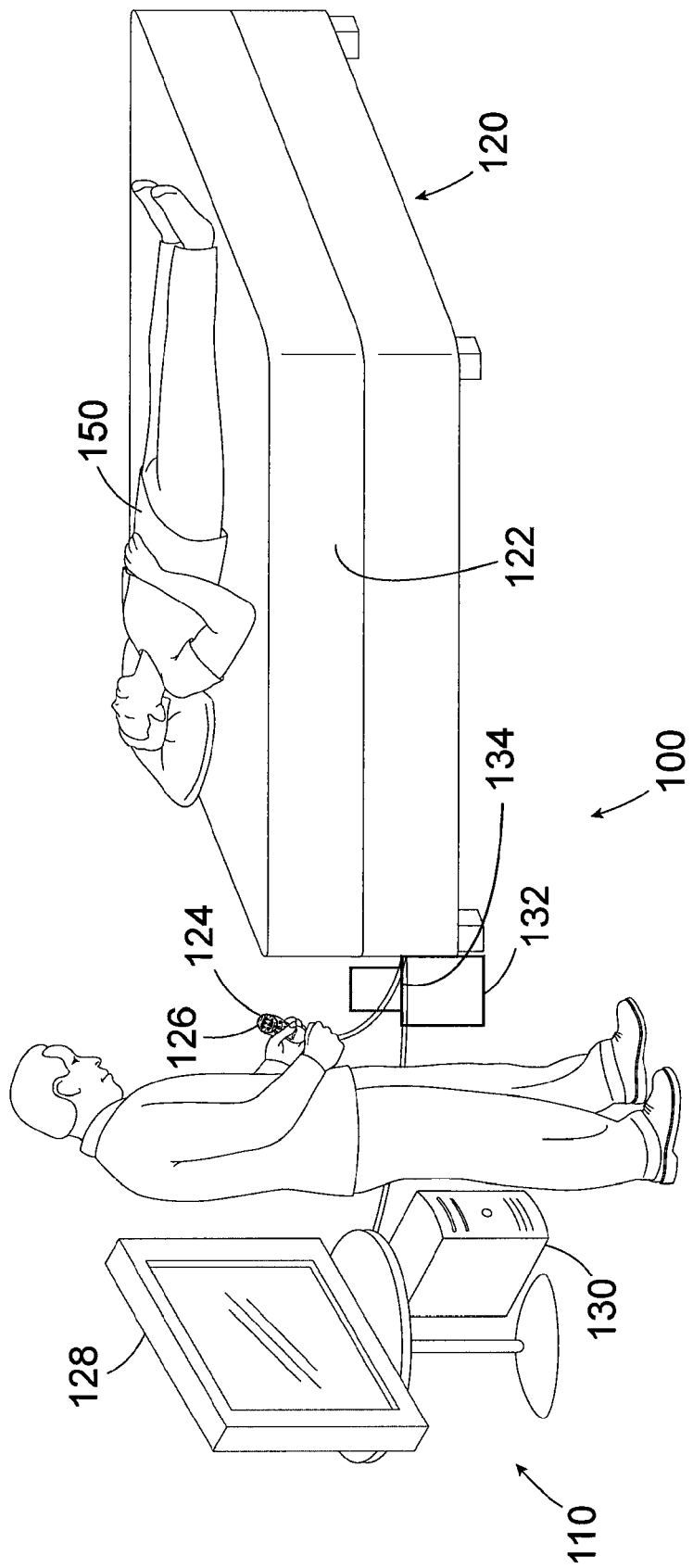
FIG. 17 shows one embodiment of a mattress selection portion of the system with a diagnostic mattress having an adjustable support structure and a control therefore.

FIG. 17 provides a general overview of the mattress selection portion of the system as employed in a retail environment, as described in one the parent applications. A diagnostic mattress with an adjustable support structure is shown generally indicated by reference character 120. Connected to the adjustable support structure 122 is a controller 124 for selectively adjusting a level of support in the support structure. An indicator 126 is provided on the controller 124 to indicate the support level of the adjustable support structure. A large screen display 128 and processor 130 may also be provided as a controller for adjusting the adjustable support structure 122. These items may be integrated with the pillow selection portion of the system previously described. In one embodiment as shown in FIG. 17, the adjustable support structure comprises an air mattress and the controller 124 controls an air pump 132 to vary pressure within the air mattress. The air pump 132 has a pressure 134 sensor adapted to sense pressure within the air mattress, and the controller is adapted to activate the pressure sensor to measure pressure within the air mattress.

Figure 18:
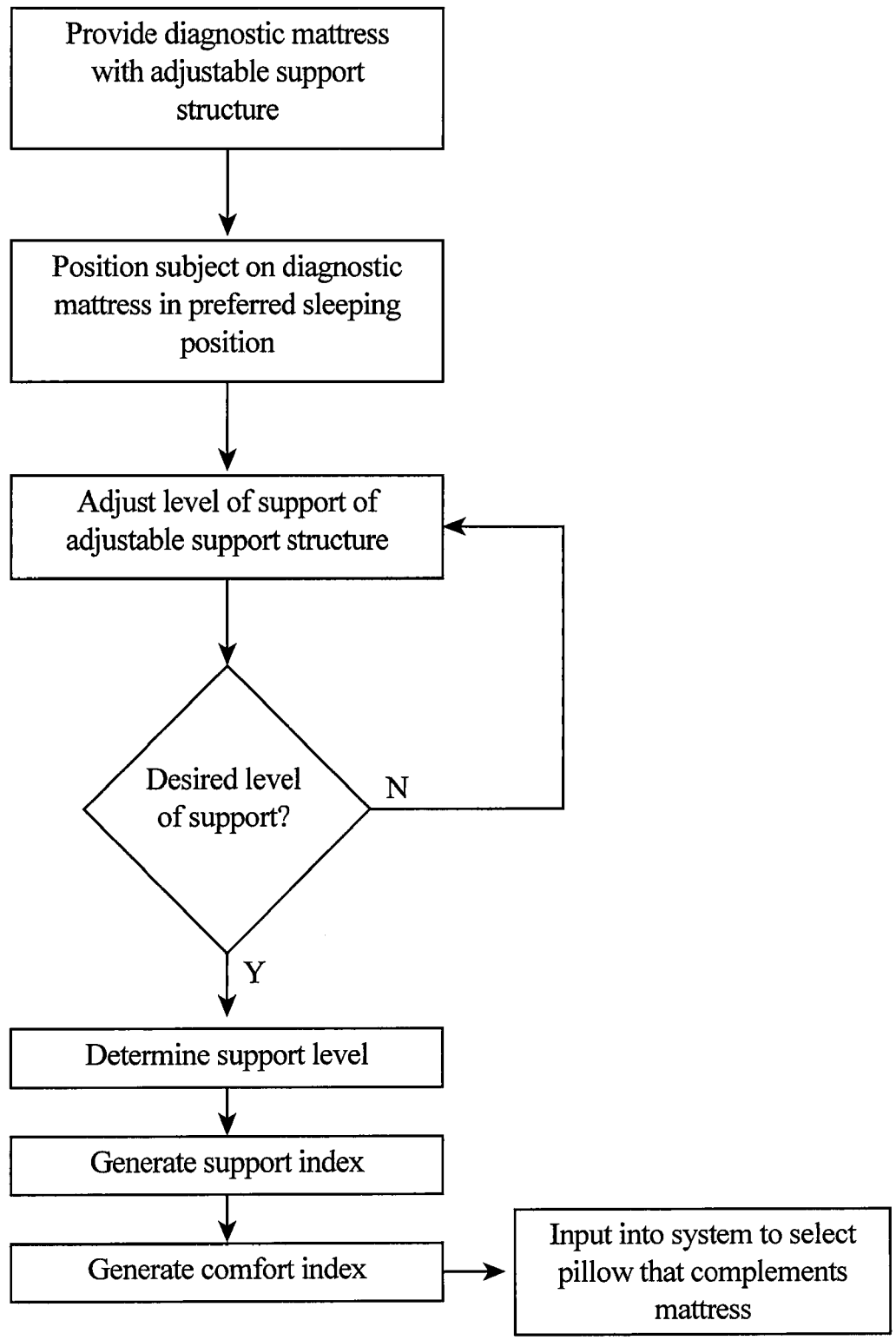
FIG. 18 shows a flow chart for obtaining a desired support level of an individual and correlating the individual's desired support level to a support characteristic of a plurality of mattresses having fixed support structures to allow the individual to select a fixed support structure support characteristic generally equal to the individual's desired support level.
Figure 19:
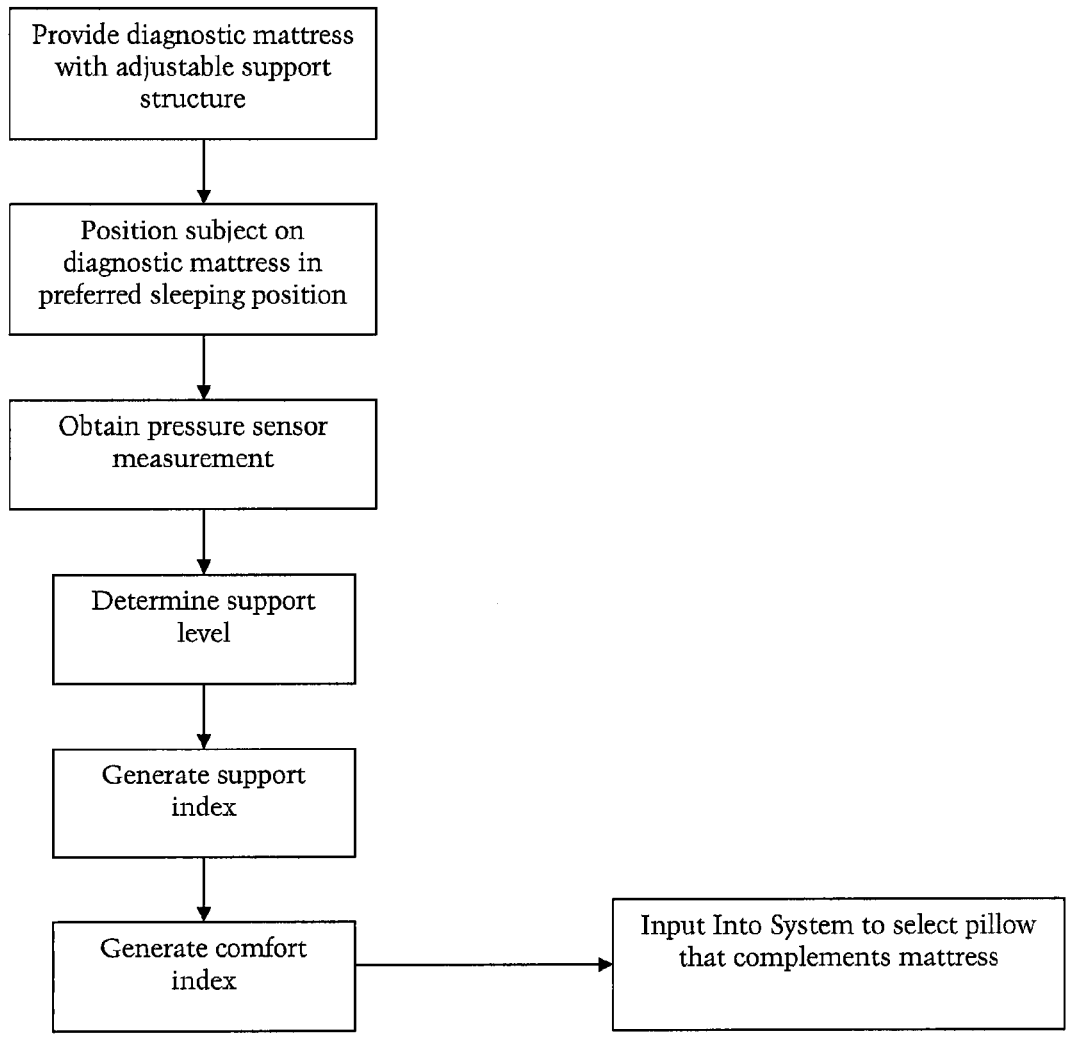
FIG. 19 shows a flow chart for obtaining the recommended support level of an individual and correlating the individual's recommended support level to a support characteristic of a plurality of mattresses having fixed support structures to allow the individual to select a fixed support structure support characteristic generally equal to the individual's recommended support level.

Referring to FIGS. 17, 18 and 19, in operation, a consumer 150 is positioned on the diagnostic mattress 120 and the adjustable support structure 122 is adjusted using the controller 124 in accordance with a desired level of support of the consumer. Alternatively, the controller of the diagnostic mattress is operated to obtain the pressure sensor measurement within the mattress with the individual positioned on the diagnostic mattress. The pressure sensor measurement corresponds to a recommended level of support. Preferably, the consumer 150 is directed to lie on the diagnostic mattress 120 in his or her predominant sleep position. Thus, while the consumer shown in FIG. 17 is lying on his or her back, it should be appreciated that the consumer could be on his or her side or stomach, if either of these were the preferred sleeping position. The level of support of the adjustable support structure is varied with the controller 124 as desired by the consumer until the consumer is satisfied with the level of support and comfort. In this way, the consumer may render an otherwise subjective criteria of support and comfort to an objective measurement, which in turn helps the consumer and salesperson efficiently select a pillow that complements the customer's mattress. Alternatively, a pressure measurement via pressure sensor 134 of the air pump 132 of the air mattress is obtained and used to develop the support/comfort index for selecting a recommended mattress. With this general overview, more detailed aspects of the embodiment invention follow below.

Diagnostic Mattress and Controller

As described previously, the diagnostic mattress 120 includes a controller 124 for adjusting the level of support of the adjustable support structure 122. The diagnostic mattress and/or adjustable support structure may be a conventional air mattress configured for retail sale to an end-user customer without modification, thereby increasing saleable, supply stocks located on the floor space of a retail establishment. In such an embodiment, the air pump 132 and the pressure sensor 134 are adapted to sense pressure within the air mattress, and the controller is adapted to activate the pressure sensor to measure pressure within the air mattress. Preferably, the controller 124 is a hand held controller with the indicator 126 indicating the relative level of support of the adjustable support structure, for instance, the pressure in the air mattress via a pressure sensor. Depending upon the type of adjustable support structure, the controller will vary. For instance, when the adjustable support structure is configured as a single chamber air mattress, the controller will be similar to a controller 160 shown in FIG. 20 and include an indicator 162 and controls 164 to adjust the amount of air pressure in the air mattress, and an actuator 165 to obtain the pressure measurement of the air mattress. Preferably, the indicator has a scale 166 indicating a relative amount of air pressure in the air mattress and a corresponding numeric representation 168 of the scale. In the embodiment shown in FIGS. 20 and 21, the numeric representation extends from 1 to 100 where 1 is an extremely low level of air pressure in the air mattress and 100 is the maximum amount of air pressure in the mattress. However, the numeric representation may be any range of numbers.

Figure 20:
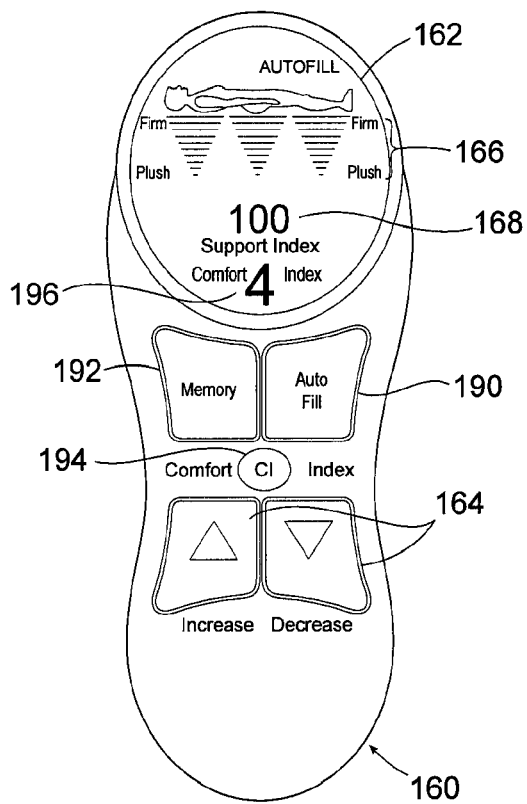
FIG. 20 shows one embodiment of an indicator of a controller of a single chamber diagnostic mattress similar to that shown in FIG. 17 displaying information related to a individual's desired level of support and an index to allow the individual to select a mattress with a fixed support structure that corresponds to the individual's desired level of support and a pillow that complements the desired mattress.
Figure 21:
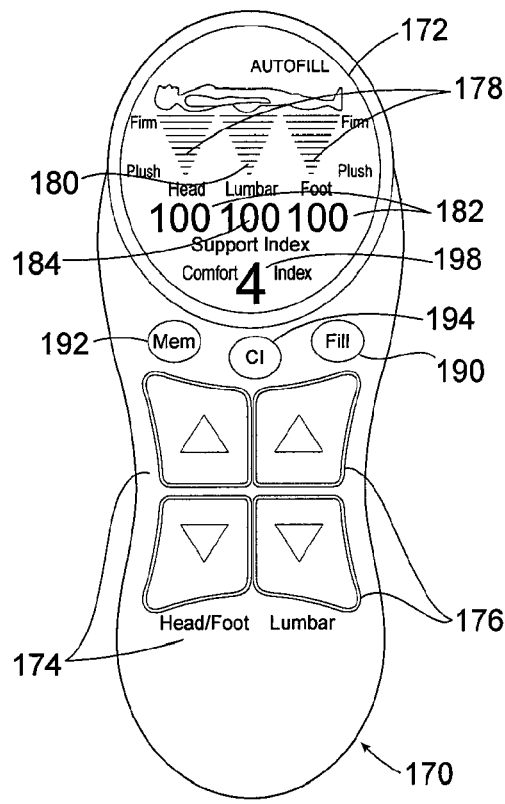
FIG. 21 shows an alternative embodiment of an indicator of a controller of a multi-chamber diagnostic mattress similar to that shown in FIG. 17 displaying information related to a individual's desired level of support for each chamber and an index to allow the individual to select a mattress with a fixed support structure that corresponds to the individual's desired level of support and a complementary pillow.

FIG. 21 shows a controller 170 of another embodiment of the present invention where the adjustable support structure comprises a three-chamber air mattress. In the three chamber air mattress contemplated by the inventor, the chambers that are aligned to the user's feet and head are in fluid communication and separated from the chamber aligned to the user's lumber region. The controller 170 includes an indicator 172 and controls for separately selecting the level of support for both the foot and head region 174, and the lumbar region 176. The controller indicator 172 displays three scales: one for each of the foot and head region 178, and one for the lumbar region 180 of the air mattress. The controller indicator also displays a numeric representation of each scale, i.e., one for each of the foot and head region 182, and one for the lumbar region 184 of the air mattress. In the embodiment shown in FIG. 21, the numeric representations 182, 184 extend from 1 to 100 for each chamber where 1 is an extremely low level of air pressure in the respective chamber and 100 is the maximum amount of air pressure in the respective chamber. Again, it should be appreciated that the numeric representations may be any range of numbers. Each of the controllers shown in FIGS. 20 and 21 may also include a control 190 for automatically adjusting the mattress to the maximum level of support, a memory button 192 for remembering a level of support and another button for displaying a comfort index 194 as will be discussed in greater detail below. To simplify the controls, each individual button may be programmed to accomplish different functions based upon the time the button is depressed. For instance, the memory button may be programmed to obtain the pressure measurement when depressed for a period of one to two seconds, and a memory function when depressed for five to six seconds.

Support Index

A consumer's desired level of support may established by adjusting the adjustable support structure 122 in accordance with the consumer's direction, thereby providing a subjective or desired support level. However, the controller may also be used to sense pressure in the air mattress via the pressure sensor in the air pump with the individual positioned on the diagnostic mattress thereby providing an objective or recommended support level. A support index may be generated to correspond to the level of support of the adjustable support structure. The support index corresponds to the numeric representation (FIG. 20, 168; FIG. 21, 182, 184) of the support level as indicated on the indicator of the controller of the adjustable support structure. Thus, the support level may comprise a scale of 1 to 100 as indicated on the indicator of the controller. The support index may be displayed continuously and in real time on the indicator. In the case of an adjustable support structure having multiple chambers, the support index may also comprise a composite of the support levels indicated on the controller. For instance, where the diagnostic mattress comprises a three chamber air mattress, the level indicated for the lumbar region may be afforded more or less weight in determining the support index depending upon the consumer's physical attributes. In other words, for a consumer with a heavier build, the lumbar region indicated level may be afforded more weight in determining the support index.

As will be described in greater detail below, the support index may be used as part of the aforementioned pillow selection system to assist a purchaser in selecting a pillow compatible with a mattress.

Comfort Index

In a preferred embodiment of the invention, the support characteristic of a plurality mattresses having fixed support structures are further categorized by a comfort index. The comfort index may correspond directly to a level of support of the adjustable support structure. The comfort index may also correspond to a range of support levels or support indices as indicated on the controller indicator. In a preferred embodiment, the comfort index may be correlated to a support index ranging between 1 and 100 by using the following chart:

| Comfort Index | Designation | Support Index |
|---|---|---|
| 1 | Plush | 1-20 |
| 2 | Medium-Plush | 21-45 |
| 3 | Medium-Firm | 46-65 |
| 4 | Firm | 66-100 |

In the above chart, one comfort index corresponds to a range of indicated support indices. Other or additional designation categories may be used, for instance, soft, plush, medium-plush, medium-firm, firm, and super-firm, and the support indices would be further defined to match these categories.

The comfort index may be displayed on the controller indicator (FIG. 20, 196; FIG. 21, 198). Preferably, the comfort index is illuminated when the comfort index button 194 is depressed on the controller. The memory button 192 on the controller may be used to remember or set a comfort index and/or support index, and automatically adjust the adjustable support structure to the set or "remembered" level of support.

As described in the parent application, a comfort index may encompass a range of support characteristics of fixed support structure mattress systems. The support characteristic of the fixed support structure of the mattress corresponds to an equivalent level of support as adjusted on the adjustable support structure of the diagnosis mattress. Empirical measurements may be used to correlate the support characteristic of the fixed support structure with the level of support of the adjustable support system, i.e., load deflection analysis. Experienced personnel may also personally test mattresses with fixed support structures vis-à-vis the diagnostic mattress of the adjustable support structure, and assign to the fixed support structure the support characteristic equivalent of the level of support as determined from the adjustable support system. Preferably, experienced personnel adjust the adjustable support structure until it matches the level of support sensed when lying on a mattress with a fixed support structure.

After the adjustable support structure is adjusted such that its level of support matches the level of support of the fixed support structure, the indicated level of support or support index of the adjustable support structure may be assigned to the fixed support structure as the support characteristic to assist the customer in selecting a mattress with his or her desired level of fixed support. The comfort index 200 may then be displayed in a prominent fashion adjacent to or on the respective fixed support structure, for instance, using a placard or banner or by affixing a tag to the mattress as described more fully in the parent application.

As will be described in greater detail, the comfort index, solely or together with the support index, may be used as part of the aforementioned pillow selection system to assist a purchaser in selecting a pillow compatible with a mattress.

As stated previously, the method and system of the present invention may include a large screen display 128 and processor 130 (FIG. 17). In a preferred embodiment, a large screen display 128 may be provided to display the relative level of support of the adjustable support structure. A computer may be provided to sense the level of support of the adjustable support structure independently of the controller, or the controller may be connected to the computer. The computer may be configured to allow an operator to use the computer to adjust the adjustable support system. The computer may be configured to create a display on the large screen display similar to that found on the indicator. The large screen display may be used to assist in making the sales presentation. Other point of sale information may be positioned about the large screen display. For instance, a kiosk (not shown) may provide a convenient station to house the large screen display, processor and point of sale information. The kiosk may include software for storing information relating to the consumer. For instance, the software may allow the generation of a personalized report of the consumer's information including his or her level of support as will be discussed below. The large screen display may be a touch screen graphic user interface thereby eliminating the need for a keyboard. The large screen display may be used in place of the controller or in addition to a separate controller. The system may interface with the retail establishment's inventory control system to provide a consumer with a list of mattresses and pillows in stock corresponding to the consumer's selected and desired support level. The system is also preferably configured to run on a network, such as the internet, to allow the diagnosis steps discussed below to be performed at a remote location.

The mattress selection system may be seamlessly integrated with the pillow selection system described previously so that, for instance, the determination of a purchaser's desired level of support and comfort for a mattress is automatically inputted into the pillow selection process, or so that complementary bedding products (i.e., mattress, box spring, pillow, mattress pad, etc.) may be determined. The recommended support level may also be input manually into the pillow section system as part of the pillow selection criteria. The desired support level may also be input manually into the pillow section system as part of the pillow selection criteria.

Operation

FIGS. 18 and 19 show the sequential steps of the methods. In operation, the salesperson or a display prompts the customer to identify the position in which the customer customarily falls asleep, i.e., side, back, or stomach. The customer then lies on the diagnostic mattress 120 in that position and the salesperson adjusts the level of support of the adjustable support structure 122 of the diagnostic mattress using the controller 124 in accordance with the direction of the customer to arrive at the perfect setting of comfort and support as defined by the customer. As shown in FIG. 18, once the customer confirms to the salesperson that the level of support of the diagnostic mattress feels "right" or that the diagnostic mattress feels "good there," the salesperson presses the "Comfort Index" button 194 on the controller and the comfort index illuminates. In an alternate embodiment (FIG. 19), once the individual is positioned on the diagnostic mattress, the salesperson may presses the "Comfort Index" button 194 on the controller to measure the pressure in the mattress via the pressure sensor. The pressure measurement may be correlated to a support index and the support index and/or the comfort index may be illuminated on the controller. Armed with the comfort index, the customer and salesperson have the necessary information to complete the pillow selection process. Further, the customer and salesperson have narrowed the search for a mattress.

Preferably, mattresses having support levels corresponding to the comfort index are on display in the retail establishment, and the consumer can chose a fixed support structure for a mattress based upon the comfort index. The plurality of mattresses may also be grouped by a plurality of mattress categories having similar fixed support structure support characteristics. Accordingly, the individual's recommended support level may corresponds to one category of the plurality of categories. Alternatively, the customer may purchase a mattress with an adjustable support and a pillow that complements the preferred support and comfort level of the adjustable support. Alternatively, a customer may purchase solely a pillow that matches the customer's experience of support and comfort of the customer's current bedding. The system my provide a written report or visual report of the individual recommended pillow(s) and/or a written report or visual report of the individual's recommended category of mattresses, the comfort index and/or the support index.

It is not necessary to have the plurality of mattresses in the same location as the diagnostic mattress. The assessment using the diagnostic mattress may be made a remote location different than that of the actual purchase.

Further, a consumer and his or her sleeping companion can each be diagnosed in the matter set forth above, and if there is a great disparity of comfort indices between the two, a mattress system may be constructed having a fixed support structure on one side that matches the one consumer and a fixed support structure on the other side that matches the other consumer.

The diagnostic mattress may also include a pressure mapping system having sensors to determine points of pressure as the consumer lies on the diagnostic mattress in his or her predominant sleep position. The computer shown in FIG. 17 may be configured with software to operate the pressure mapping program and display results on the larger screen display. The results of the pressure mapping system may be used to determine if the consumer's desired level of support properly alleviates pressure points. For instance, it has been determined that if a sleeping person experiences pressure in excess of 32 ml of pressure, the person will awake from the sleep sufficiently to reposition themselves. To provide a sound night's rest, a consumer may wish to reduce pressure and the corresponding frequency of tossing and turning. A pressure mapping system used in conjunction with the diagnostic method employed herein provides a cross check to ensure the consumer's desired level of support does not create pressure points that exceed 32 ml of pressure. A pressure mapping system may also be used as a starting point for adjusting the adjustable support structure and naturally arriving at a consumer's desired support level.

Integrated Pillow and Mattress Selection Program

As set forth herein, the index (either support index or comfort index) may be used as an input to assist the purchaser in selecting a pillow compatible with a mattress thereby minimizing the risk that a customer will purchase a pillow that is nor optimal for his or her sleep characteristics. One embodiment of an integrated pillow and mattress selection system is described below with reference to FIGS. 2-16.

Figure 2:
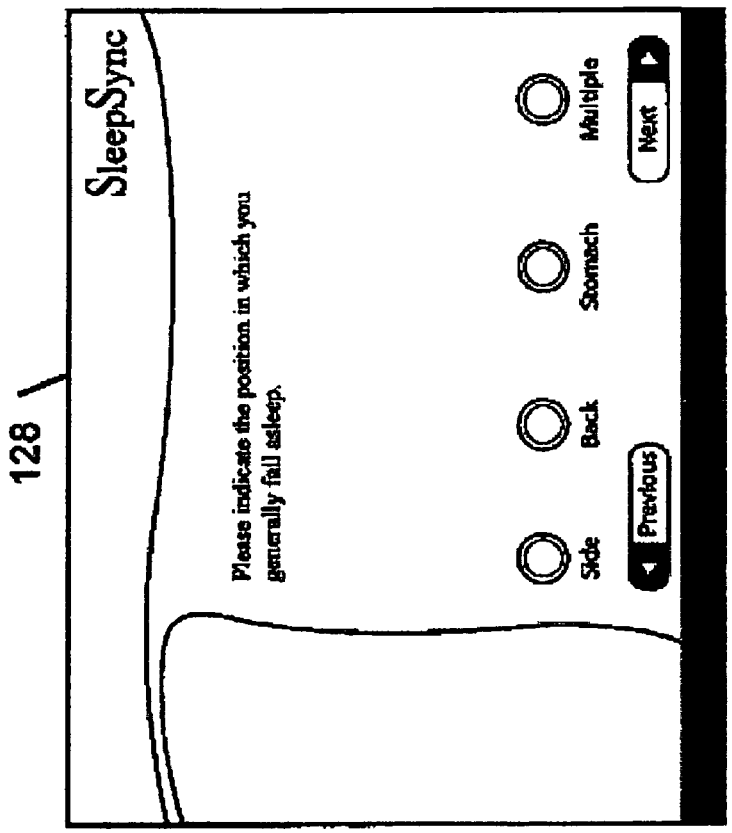
Figure 5:
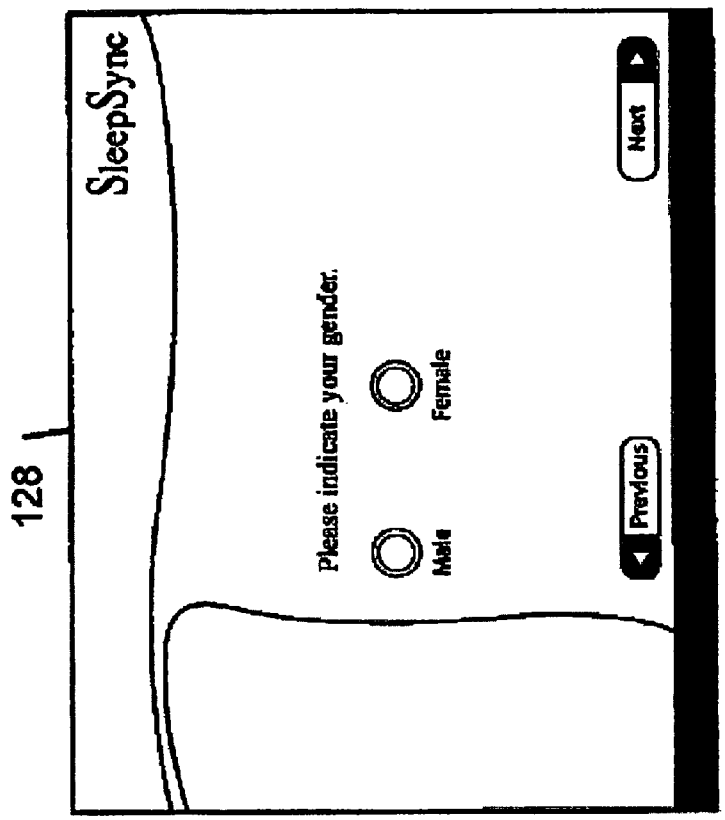
Figure 4:
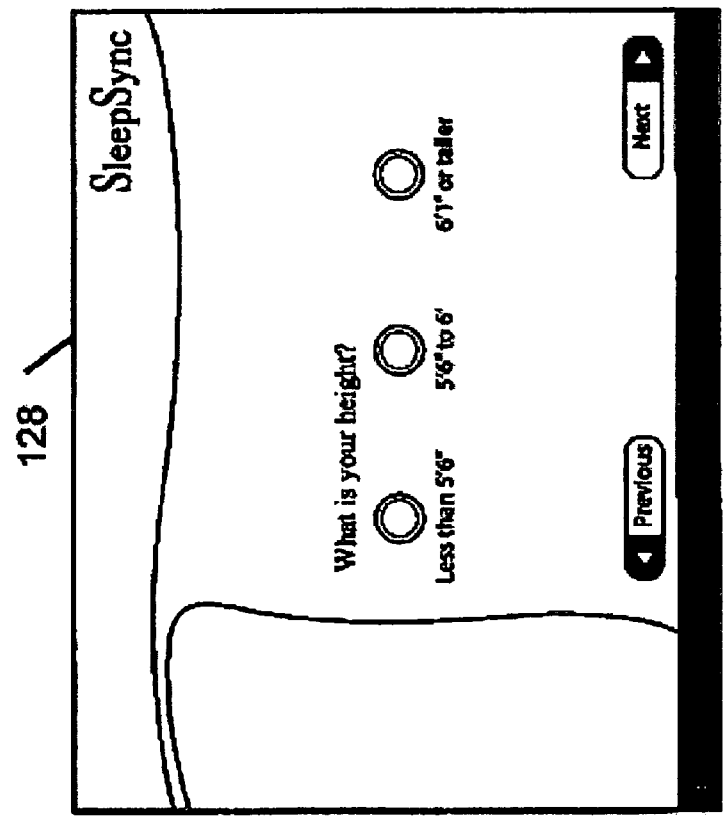
Figure 7:
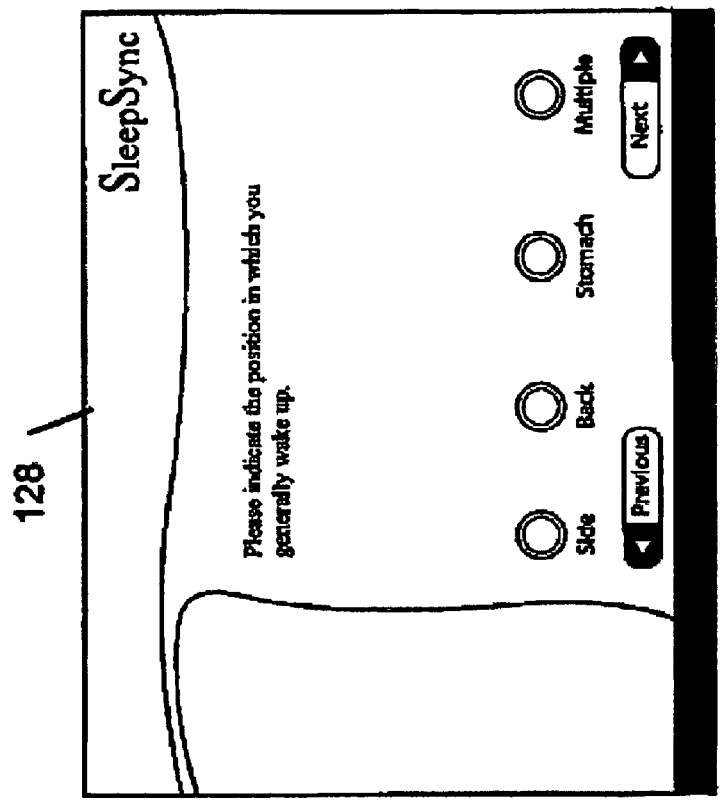
Figure 6:
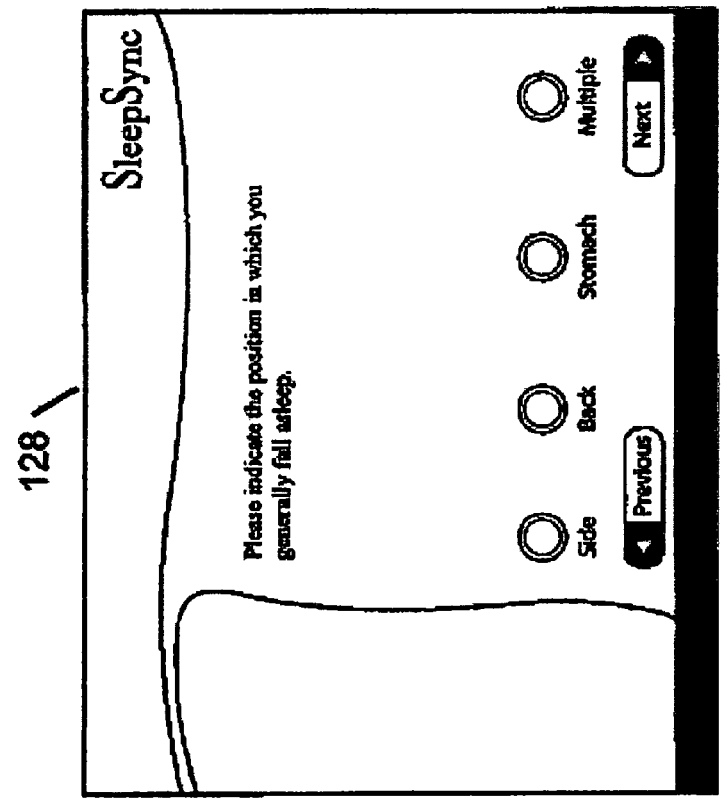
Figure 9:
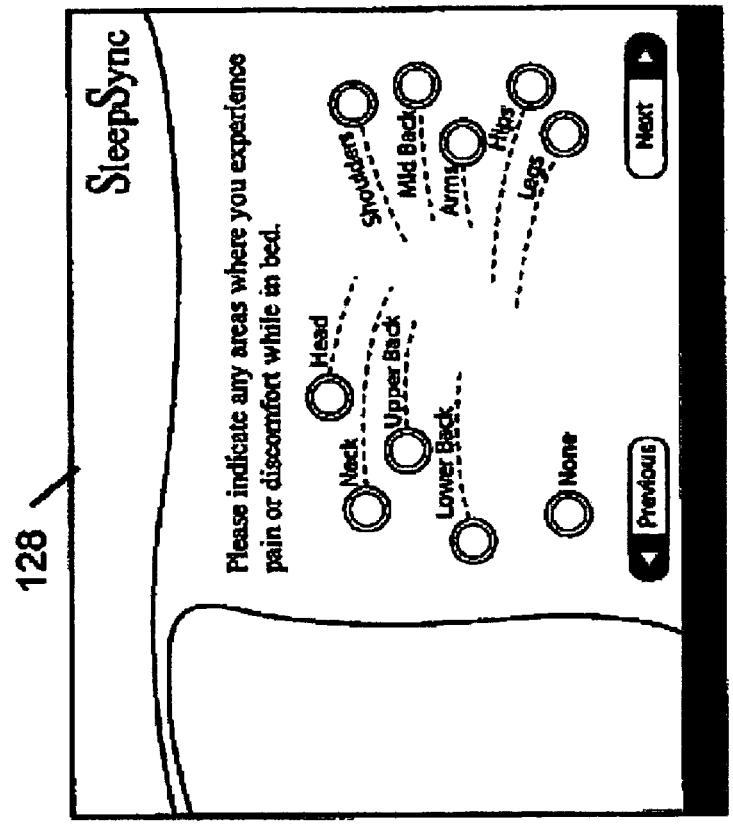
Figure 8:
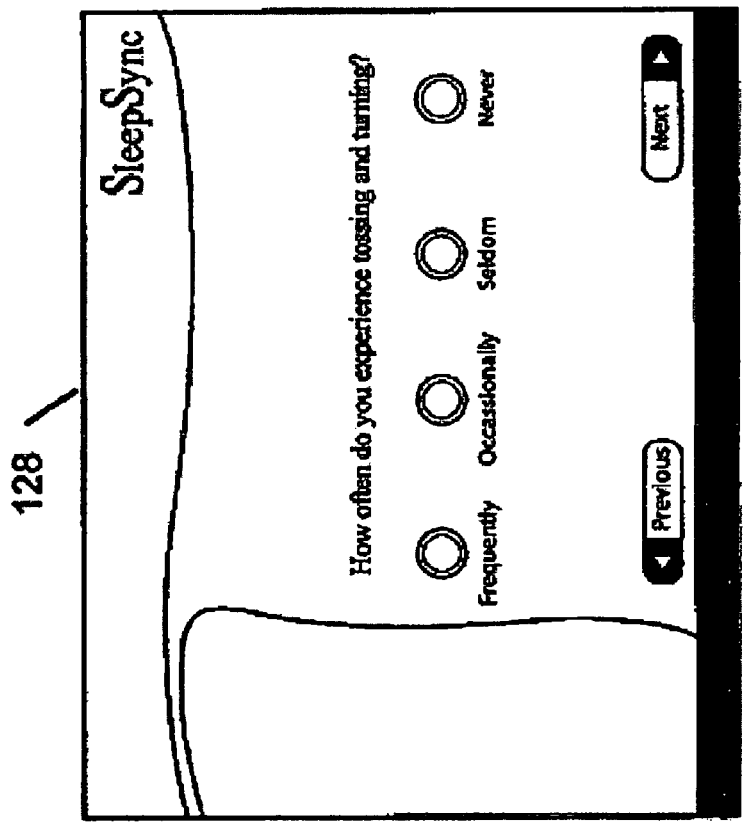
Figure 11:
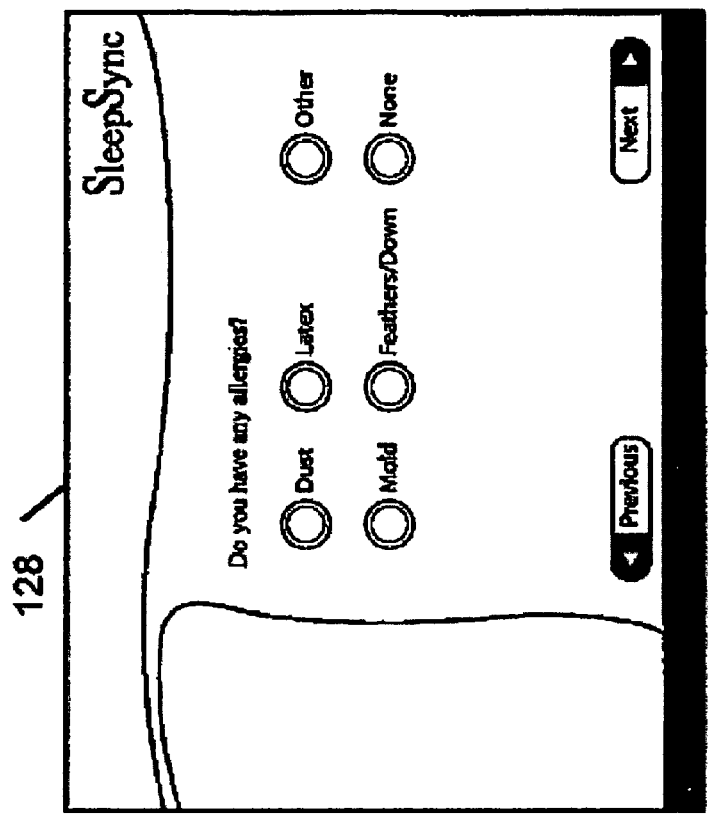
Figure 10:
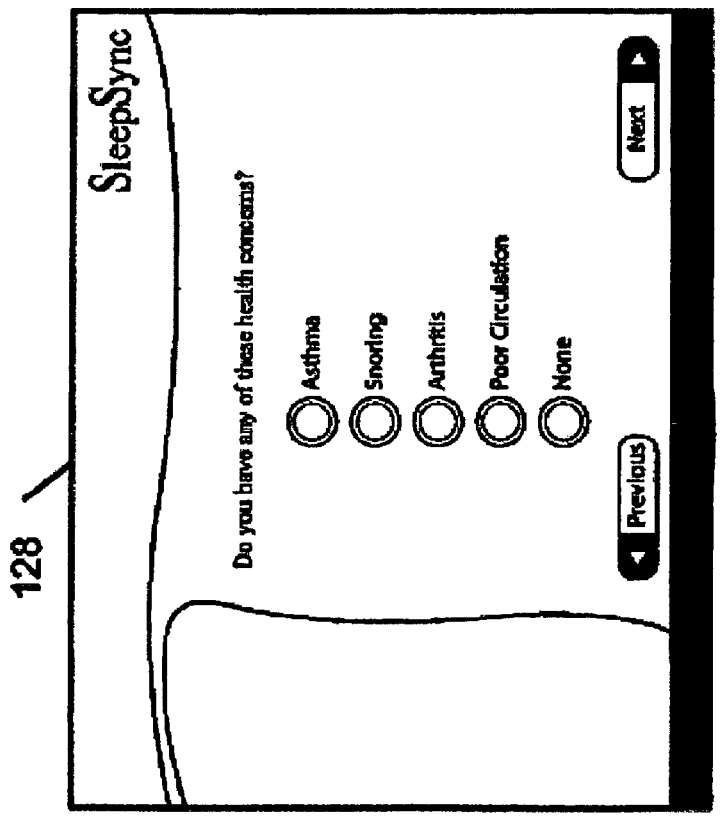

FIG. 2 shows a screen displayed on display 128 that asks the purchaser for what type of mattress the purchaser is shopping. The display screen includes a set of answers to the question from which the purchaser can select a desired mattress type. FIGS. 3-11 show examples of screens that are displayed on the display 128 that ask the purchaser questions about the purchaser's sleep patterns. The screens displayed on display 128 each ask a question and provide a set of answers from which the purchaser can input into the computer system selection criteria for the pillow selection module of the computer system. Some of the questions and the answers in the answer set are similar to those set forth above. Preferably, the system has a graphical user interface that displays graphics that are intuitive and facilitate the purchaser's selection of an answer to the question to quickly develop the selection criteria for the pillow selection system. Preferably, the graphics also enhance the purchaser's buying experience. It is contemplated that the system may be customized for a retailer and screens may be changed and/or removed depending upon the types of pillows stocked by the retailer.

Figure 15:
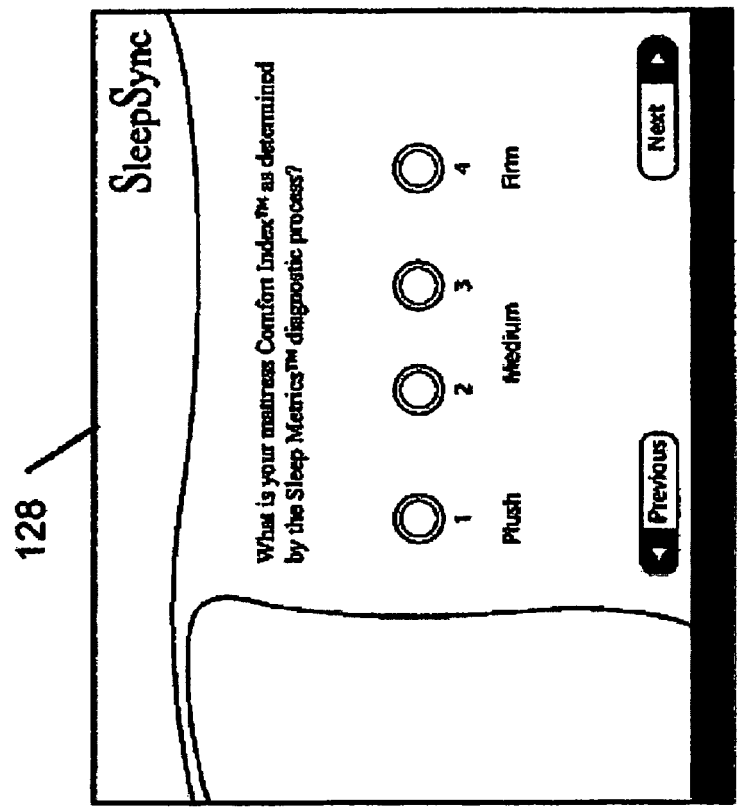
Figure 14:
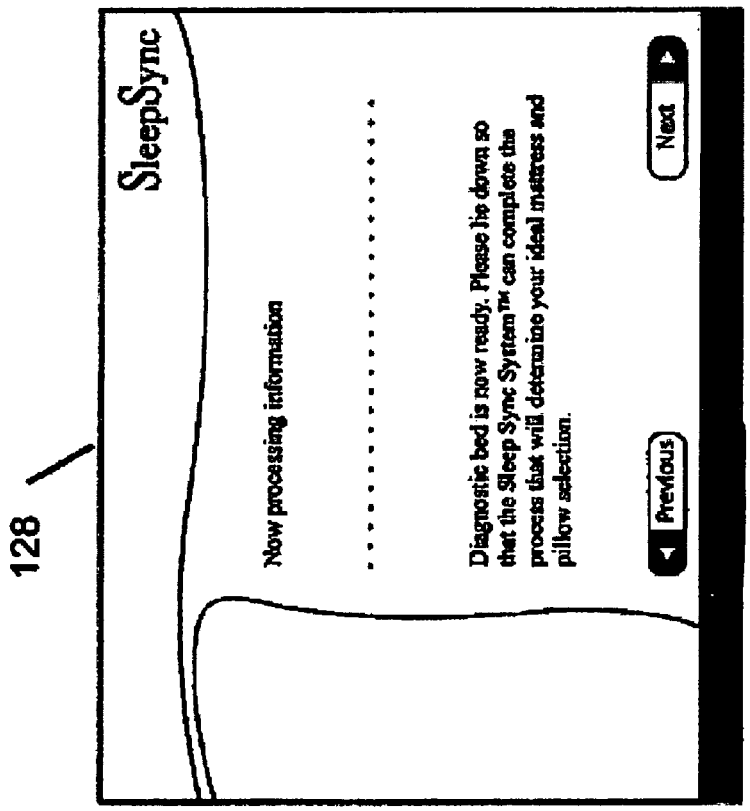

FIGS. 12 and 13 provide additional screens related to developing selection criteria for the pillow and mattress based upon the age of the purchaser's current bedding. FIG. 14 shows a graphical display that prompts the purchaser to begin the mattress selection process where the purchaser is directed to position his or herself on the diagnostic mattress and the diagnostic mattress is adjusted in accordance with the purchaser's desired level of comfort. The recommended support level may also be determined by sensing and/or measuring the pressure in the air mattress. As described earlier, an index may be generated indicative of the purchaser's desired level of comfort, and may include the support index and/or the comfort index. After the purchaser's support level (either recommended and/or desired) is determined via the diagnostic mattress, the purchaser inputs the support level in the form of a comfort index via the display 128 as shown in FIG. 15. The system next determines a recommended pillow and displays that information to the purchaser as shown in FIG. 16. Display 128 may also display and/or print-out in a written report to the purchaser recommended bedding accessories that complement the recommended pillow and mattress. The screens shown in FIGS. 2-16 may be shown on the display 128 as shown in FIG. 17 or a display of a computer kiosk (not shown) along with other point of sale information.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method comprising:

providing a diagnostic mattress comprising an air mattress with a controller and an air pump, the controller being adapted to control the air pump to vary pressure within the air mattress, the air pump having a pressure sensor adapted to sense pressure within the air mattress, and the controller being adapted to activate the pressure sensor to measure pressure within the air mattress;

positioning an individual on the diagnostic mattress;

operating the controller to measure a pressure of the air mattress via the pressure sensor with the individual positioned on the diagnostic mattress;

correlating the measured pressure of the individual positioned on the diagnostic mattress to a recommended support level associated with the individual;

correlating the individual's recommended support level to a support characteristic of a plurality of mattresses having a fixed support structure in a way sufficient to allow the individual to select a fixed support structure support characteristic generally equal to the individual's recommended support level as determined from the diagnostic mattress.

2. The method of claim 1, wherein the plurality of mattresses is grouped by a plurality of mattress categories having similar fixed support structure support characteristics and the individual's recommended support level corresponds to one category of the plurality of categories.

3. The method of claim 1, further comprising generating an index representative of the individual's recommended support level.

4. The method of claim 3, further comprising displaying the index on the controller.

5. The method of claim 1, wherein the diagnostic mattress is a conventional air mattress configured for retail sale to an end-user customer without modification.

6. The method of claim 2, further comprising displaying on the controller indicia representing the category corresponding to the individual's recommended support level.

7. The method of claim 1, further comprising:
providing a computer system having a user interface and a database configured to store data relating to pillows including pillow models;
receiving a plurality of pillow selection criteria associated with the individual via the user interface including the individual's recommended support level; and
determining at least one recommended pillow model for the individual based on at least one of the individual's pillow selection criteria and the individual's recommended support level.

8. The method of claim 7 wherein the pillow selection criteria associated with the individual is summarized on a display screen operatively connected to the user interface and via a printed report presentable to the individual.

9. The method of claim 7, wherein the pillow selection criteria comprise at least one of the individual's preferred sleep position, the individual's allergy condition, the individual's health concerns, the individual's height, the individual's gender, and the individual's sleep characteristics.

10. The method of claim 7, wherein the step of receiving the plurality of pillow selection criteria comprises generating a plurality of questions determinative of the individual's pillow selection criteria to be displayed and answered via the user interface.

11. The method of claim 7, wherein the individual's recommended support level is input into the user interface as part of the pillow selection criteria.

12. The method of claim 7, wherein the step of positioning the individual comprises positioning the individual on the diagnostic mattress in accordance with the individual's desired position for sleeping.

13. The method of claim 7, further comprising displaying the at least one recommended pillow model to the individual.

14. The method of claim 7, further comprising displaying complementary bedding products to the individual based upon data input into the user interface.

15. The method of claim 7, further comprising displaying on the controller indicia representing the individual's recommended support level.

* * * * *